(12) United States Patent
Lee et al.

(10) Patent No.: US 8,767,296 B2
(45) Date of Patent: Jul. 1, 2014

(54) DEVICE FOR PRODUCING POLARIZING FILM AND METHOD OF PRODUCING THE SAME

(75) Inventors: Ho Kyung Lee, Daejeon (KR); Chang Song Lee, Daejeon (KR); Kyu Hwang Lee, Daejeon (KR); Eung Jin Jang, Chungcheongbuk-do (KR); Joong Suk Nah, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/702,534

(22) PCT Filed: Jun. 2, 2011

(86) PCT No.: PCT/KR2011/004035
§ 371 (c)(1),
(2), (4) Date: Feb. 19, 2013

(87) PCT Pub. No.: WO2011/155725
PCT Pub. Date: Dec. 15, 2011

(65) Prior Publication Data
US 2013/0170032 A1    Jul. 4, 2013

(30) Foreign Application Priority Data
Jun. 9, 2010 (KR) .................. 10-2010-0054436

(51) Int. Cl.
*G02B 5/30* (2006.01)
(52) U.S. Cl.
CPC .................................... *G02B 5/3033* (2013.01)
USPC ..................................... 359/487.02; 264/1.34

(58) Field of Classification Search
None
See application file for complete search history.

(56) References Cited

FOREIGN PATENT DOCUMENTS

| | | |
|---|---|---|
| JP | 2006-065309 | 3/2006 |
| JP | 2006-282918 | 10/2006 |
| JP | 2007-199509 | 8/2007 |
| JP | 2007-212587 A | 8/2007 |
| JP | 2007-226035 | 9/2007 |
| KR | 10-2003-0083518 A | 10/2003 |
| KR | 10-2008-0088425 | 10/2008 |
| KR | 10-2009-0033188 | 4/2009 |
| KR | 10-2009-0068760 A | 6/2009 |
| KR | 10-2009-0070080 A | 7/2009 |
| KR | 10-2009-0070085 | 7/2009 |
| KR | 10-2006-0097401 A | 9/2009 |
| KR | 10-2010-0003558 | 1/2010 |
| WO | WO 2007/108243 A1 | 9/2007 |

*Primary Examiner* — Derek S Chapel
(74) *Attorney, Agent, or Firm* — McKenna Long & Aldridge LLP

(57) ABSTRACT

Disclosed herein is an apparatus for preparation of a film exhibiting polarizing properties by dyeing a substrate film with iodine and then orienting the same through a continuous process, comprising a first bath equipped with a thermometer to measure a temperature of the first bath; a second bath equipped with a thermometer to measure a temperature of the second bath and a densitometer to measure a concentration of the second bath; a third bath in which the iodine-dyed PVA film is stretched by a drawing roller; an oven equipped with a thermometer to measure a temperature of the oven; and a central controller that predicts a transmittance of the polarizing film, and then, controls the temperatures of the first and second baths and the oven and an amount of a composition fed to the second bath.

11 Claims, 5 Drawing Sheets

DEVICE FOR PRODUCING POLARIZING FILM AND METHOD OF PRODUCING THE SAME

This application is a National Stage Entry of International Application No. PCT/KR2011/004035, filed Jun. 2, 2011, and claims the benefit of Korean Application No. 10-2010-0054436, filed on Jun. 9, 2010, which are hereby incorporated by reference in their entirety for all purposes as if fully set forth herein.

TECHNICAL FIELD

The present invention relates to an apparatus for preparation of a polarizing film and, more particularly, to an apparatus for preparation of a polarizing film by iodine-dyeing a substrate film through a continuous process then orienting the dyed film to produce the polarizing film, which consists of; a first bath equipped with a thermometer to measure a temperature of the first bath; a second bath equipped with a thermometer to measure a temperature of the second bath and a densitometer to measure a concentration of the second bath; a third bath to orient dyed iodine; an oven equipped with a thermometer to measure a temperature of the oven; and a central controller that predicts a transmittance of the polarizing film, on the basis of information regarding characteristics of input data measured by the above thermometers of the first and second baths and the oven as well as the densitometer of the second bath, and information regarding characteristics of a PVA film introduced into the continuous process, and then, controls the temperatures of the first and second baths and the oven and an amount of a composition fed to the second bath.

BACKGROUND ART

A polarizing sheet or polarizing film functions in general to convert natural light into polarized light. Such polarizing function may be embodied using a material with which a polarizing sheet is dyed. A liquid crystal display generally has an iodine type polarizing film dyed with iodine, as a polarizing material.

Such an iodine type polarizing film is dyed using dichroic iodine or dichroic dyes, oriented in a predetermined direction through, for example, uniaxial drawing (or orientation) and widely used to manufacture LCDs. For instance, a process of uniaxially orienting an un-oriented PVA film in an aqueous solution and then dipping the oriented PVA film in a solution containing iodine and/or potassium iodide, a process of dipping an un-oriented PVA film in a solution containing iodine and/or potassium iodide then uniaxially orienting the treated PVA film, a process of uniaxially orienting an un-oriented PVA film in a solution containing iodine and/or potassium iodide, a process of uniaxially orienting an un-oriented PVA film in a dried state and then dipping the oriented PVA film in a solution containing iodine and/or potassium iodide, and the like, may be used to prepare a polarizing film.

The PVA film having iodine adsorbed and oriented therein may be subjected to post-treatment through water washing or drying to thereby obtain a polarizing film and, by laminating a protective film to at least one side of the formed polarizing film, a polarizing sheet may be fabricated as a final product. Meanwhile, in the case where the PVA film is changed (replaced) during manufacture of the polarizing sheet, a sample is taken by preparing a polarizing film through trial operation and then cutting the polarizing film, followed by measuring a transmittance of the sample. Thereafter, in order to comply with standard specifications, the sample is generally treated by applying process factors, adding subsidiary materials thereto, and/or diluting the sample.

However, the method of measuring transmittance of a polarizing film after preparing the same through trial operation as described above entails problems of increasing PVA film loss and production cost due to shut-down of a production line in order to measure the transmittance. Furthermore, considering that the polarizing film is commonly prepared through a continuous process, consumption of a large amount of PVA film cannot be avoided during measurement of transmittance.

Accordingly, there is a strong demand for a novel apparatus capable of preparing a polarizing film so as to solve problems of the conventional art described above and minimize loss of materials when a PVA film is replaced.

DISCLOSURE

Technical Problem

Accordingly, the present invention has been made to solve the above and other technical problems that have yet to be resolved.

As a result of a variety of extensive and intensive studies and experiments to solve the problems as described above, the inventors of the present invention have found that, if an apparatus for preparation of a polarizing film includes: a first bath equipped with a thermometer to measure a temperature of the first bath; a second bath equipped with a thermometer to measure a temperature of the second bath and a densitometer to measure a concentration of the second bath; an oven equipped with a thermometer to measure a temperature of the oven; and a central controller that predicts a transmittance of the polarizing film, on the basis of information regarding characteristics of input data measured by the above thermometers of the first and second baths and the oven as well as the densitometer of the second bath, and information regarding characteristics of a PVA film introduced into the continuous process, and then, controls the temperatures of the first and second baths and the oven and an amount of a composition fed to the second bath, the transmittance may be successfully predicted on the basis of characteristics of the PVA film introduced to manufacture a polarizing film and, therefore, material loss of the PVA film and a shutdown period of a production line may be considerably reduced by regulating an amount of the composition fed to the second bath as well as temperatures of individual devices, in advance. The present invention was completed based on this discovery.

Technical Solution

Therefore, in order to accomplish the foregoing purposes, according to an aspect of the present invention, there is provided an apparatus for preparation of a film exhibiting polarizing properties (hereinafter, referred to as a 'polarizing film') by dyeing a substrate film with iodine through a continuous process and then orienting the dyed film.

Such an apparatus may include:

a first bath equipped with a thermometer to measure a temperature of the first bath ('first bath thermometer'), in which a polyvinylalcohol (PVA) film as a substrate film is washed;

a second bath equipped with a thermometer to measure a temperature of the second bath ('second bath thermometer') and a densitometer to measure a concentration of the second bath ('second bath densitometer'), in which the washed PVA film is dipped in an iodine solution and dyed therein;

a third bath in which the iodine-dyed PVA film is stretched by a drawing roller to thereby orient the dyed iodine;

an oven equipped with a thermometer to measure a temperature of the oven ('oven thermometer') to dry the iodine-oriented PVA film; and a central controller that predicts a transmittance of the polarizing film, on the basis of information regarding characteristics of input data measured by the above thermometers of the first and second baths and the oven as well as the densitometer of the second bath, and information regarding characteristics of a PVA film introduced into the continuous process, and then, controls the temperatures of the first and second baths and the oven and an amount of a composition fed to the second bath.

Briefly, the inventive apparatus for preparation of a polarizing film may predict a transmittance of the polarizing film in advance, on the basis of some data having relatively higher correlation, e.g., temperatures of the first bath and the oven, a temperature of the second bath and a concentration thereof, as well as information regarding characteristics of a PVA film introduced into a continuous process, among various factors (or parameters) influencing the transmittance of the polarizing film, and therefore, may control an amount of a composition fed to the second bath as well as the temperatures of the first and second baths and the oven, depending upon the predicted transmittance. Accordingly, for example, compared to a conventional process for manufacturing a polarizing film wherein, when a PVA film is replaced, an amount of a feed composition is controlled after preparing the polarizing film during trial operation and measuring a transmittance thereof, the present invention needs neither production line shutdown nor increase in consumption of PVA film for trial operation, thereby reducing PVA film loss while improving utilization of the production line.

Since the second bath generally has a large scale, a temperature thereof may be varied at different measuring sites in consideration of reaction conditions in the second bath. In order to solve the above problem, the second bath thermometer may measure the temperature at two or more parts of the second bath.

In this case, the part of the second bath, at which a temperature is measured, may include, for example; top and bottom of a PVA film; a temperature measuring site of the second bath when the second bath is agitated and another temperature measuring site of the second bath without agitation thereof to standardize a concentration therein, and the like.

Since the second bath is used to dip the washed PVA film in an iodine solution and dye the same, a concentration of the second bath is substantially an overall concentration of iodine and potassium iodide or, otherwise, a composition placed in the second bath may comprise both iodine and potassium iodide.

According to a preferred embodiment of the present invention, an apparatus for preparation of a polarizing film may further include a composition feeder to replenish the composition present in the second bath, based on results of transmittance prediction by the central controller. Therefore, according to the predicted results of the transmittance of PVA film, the composition feeder may automatically replenish the second bath with the composition, that is, iodine and/or potassium iodide.

Transmittance prediction of PVA film may be performed by a PVA film transmittance model based on partial least squares (PLS).

For reference, PLS refers to a method of processing measured results by estimating sums of squares from measured values and calculating a least value thereof.

A PVA film transmittance model based on PLS may be, for example, a multiple regression analysis model to predict the transmittance of the PVA film using temperatures measured by the thermometers of the first and second baths and the oven, as well as a concentration measured by the densitometer of the second bath.

Practical examples of the transmittance prediction model of PVA film may be represented as follows.

$$\text{Predicted transmittance of PVA film} = ax_1 + bx_2 + cx_3 + dx_4 + ex_5 + fx_6 + gx_7 + h$$

wherein $x_1$ is a concentration of iodine, $x_2$ is a concentration of potassium iodide, $x_3$ is a temperature of a first bath, $x_4$ and $x_5$ are temperatures of two parts of a second bath, $x_6$ is a temperature of a first oven, and $x_7$ is a temperature of a second oven.

In addition, a, b, c, d, e, f and g as regression coefficients and a constant 'h' may be calculated by PLS.

The inventors of the present invention have conducted the multiple regression analysis using seven variables including; a temperature of the first bath, temperatures of two sites in the second bath, a temperature of the oven, and a concentration of the second bath (concentrations of iodine and potassium), as input data. As a result thereof, it can be seen that a correlation coefficient of 0.9006 is acquired and a predicted transmittance of a polarizing film from a PVA film may exhibit accuracy of 90% or more in relation to a measured transmittance from the same PVA film, as shown in FIG. 4.

Meanwhile, the inventive apparatus for preparation of a polarizing film may further include a first annex bath 1A to swell the washed PVA film and a second annex bath 2A to wash the dyed PVA film.

For example, the annex bath 1A may be located between the first bath and the second bath while the annex bath 2A may be located between the second bath and a third bath.

The present invention also provides a polarizing sheet fabricated by attaching a protective film to each of top and bottom sides of the polarizing film formed by the preparation apparatus as described above.

The protective film may comprise triacetyl cellulose (TAC).

The present invention also provides a method for preparation of a polarizing film. More particularly, the method for preparation of a film exhibiting polarizing properties ('polarizing film') by dyeing a substrate film with iodine and then orienting the same through a continuous process. Such method may include:

a first process of washing a PVA film as the substrate film in a first bath and measuring a temperature of the first bath using a first bath thermometer;

a second process of dipping the washed PVA film in a second bath containing an iodine solution, dyeing the same, and measuring temperature and concentration of the second bath using a second bath thermometer and a second bath densitometer;

a third process of stretching the iodine-dyed PVA film through a drawing roller to orient the dyed iodine of the PVA film in a third bath;

a drying process of drying the iodine-oriented PVA film in an oven and measuring a temperature of the oven using an oven thermometer; and a control process of predicting a transmittance of a polarizing film, on the basis of information regarding characteristics of input data measured by the above thermometers of the first and second baths and the oven as well as the densitometer of the second bath, and information regarding characteristics of a PVA film introduced into the continuous process, and then, controlling the temperatures of the first and second baths and the oven and an amount of a composition fed to the second bath.

Therefore, on the basis of some data including temperatures of the first bath and the oven, and a temperature and concentration of the second bath, which considerably influence a transmittance of a polarizing film, as well as information regarding characteristics of a PVA film introduced into a continuous process, the transmittance of the polarizing film may be successfully predicted and, therefore, an amount of the composition fed to the second bath as well as the temperatures of the first and second baths and the oven may be controlled depending upon the predicted transmittance. Consequently, it is possible to minimize loss of the PVA film.

For instance, the PVA film may be dipped in the second bath containing an iodine solution at 20 to 40° C. during dyeing, and be dried in the oven at 40 to 60° C. during the drying process.

Meanwhile, the iodine solution used herein may be an aqueous solution containing 0.01 to 1 wt. % iodine and 0.01 to 10 wt. % potassium iodide.

Optionally, the foregoing third process may be divided into fourth and fifth processes depending upon variation in revolution of the drawing roller, wherein the PVA film may show a draw ratio of 1.5 to 3.0 times during the fourth process while having a draw ratio of 2.0 to 3.0 times during the fifth process.

Accordingly, the PVA film obtained after the third process described above may have an overall draw ratio of at least 3.5 times, thus enabling production of a polarizing film having excellent optical properties.

According to a preferred embodiment of the present invention, the method for preparation of a polarizing film may further include a first annex process 1A of swelling the washed PVA film in a swelling tank and a second annex process 2A of washing the dyed PVA film in a washing tank, thereby enabling production of a polarizing film having improved optical properties.

BRIEF DESCRIPTION OF THE DRAWINGS

The above and other objects, features and other advantages of the present invention will be more clearly understood from the following detailed description taken in conjunction with the accompanying drawings, in which.

BEST MODE

The present invention will be described in more detail with reference to the accompanying drawings. However, these are provided only to illustrate the present invention and should not be construed as limiting the scope and spirit of the present invention.

Figure 1:
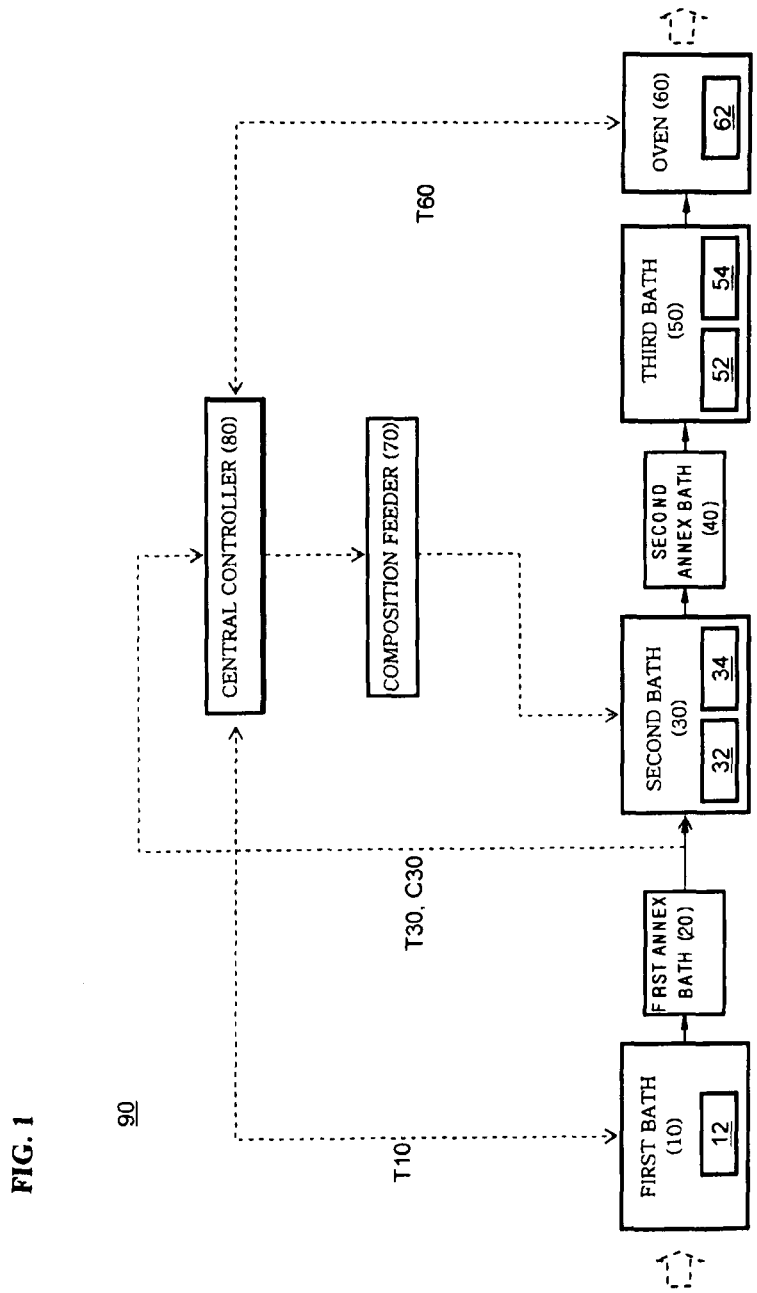
FIG. 1 is a schematic block diagram showing an apparatus for preparation of a polarizing film according to an embodiment of the present invention.

FIG. 1 is a schematic block diagram showing an apparatus for preparation of a polarizing film according to an embodiment of the present invention.

Referring to FIG. 1, an apparatus 90 for preparation of a polarizing film according to the present invention comprises: a first bath 10 for washing a polyvinylalcohol (PVA) film as a substrate film; a first annex (1A) bath 20 for swelling the washed PVA film; a second bath 30 in which the washed PVA film is dipped in an iodine solution and dyed therein; a second annex (2A) bath 40 for washing the dyed PVA film; a third bath 50 in which the iodine-dyed PVA film is stretched through a drawing roller to thereby orient the dyed iodine; an oven 60 for drying the iodine-oriented PVA film; a composition feeder 70 to replenish the composition fed to the second bath 30, on the basis of results of transmittance prediction from a central controller 80; and the central controller 80.

Therefore, the PVA film introduced into the first bath 10 may pass through the 1A bath 20, second bath 30, 2B bath 40, third bath 50 and oven 60 in sequential order, resulting in a polarizing film.

The first bath 10 and the oven 60 may have thermometers 12 and 62, respectively, to measure temperatures thereof, while the second bath 30 may have a second bath thermometer 32 to measure a temperature thereof and a second bath densitometer 34 to measure a concentration of a composition.

In addition, the second bath thermometer 32 may measure the temperature at two points in the second bath, and the composition contained in the second bath may comprise iodine and potassium iodide.

The central controller 80 may predict a transmittance of a PVA film, on the basis of some data including; temperatures T10, T30 and T60 measured by thermometers 12, 32 and 62 of the first bath 10 and second bath 30 and the oven 60, respectively, as well as a concentration C30 of the second bath measured by the densitometer 34 of the second bath 30, and characteristics of the PVA film introduced into a continuous process, and then, may control an amount of a composition fed to the second bath, as well as the temperatures of the first bath 10, second bath 30 and oven 60, respectively.

The concentration C30 of the second bath may be an overall concentration of iodine and potassium iodide, and transmittance prediction of the PVA film may be performed by multiple regression analysis as a PVA film transmittance model based on PLS.

Figure 2:
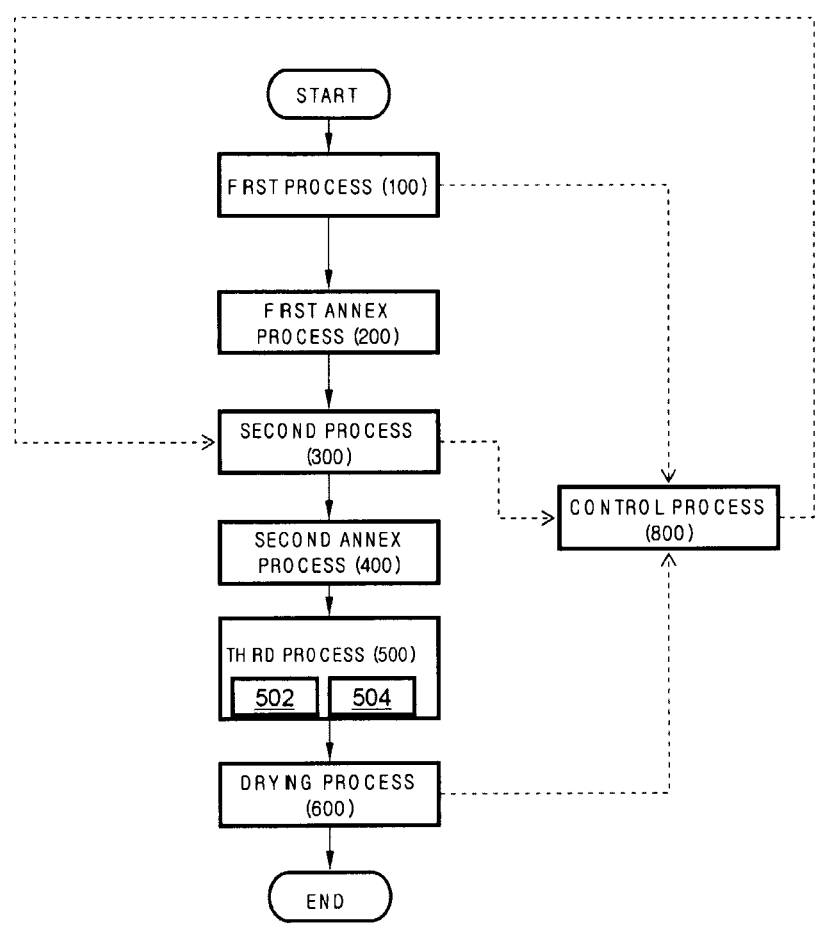
FIG. 2 is a schematic flowchart showing a method for preparation of a polarizing film according to another embodiment of the present invention.

FIG. 2 is a schematic flowchart showing a method for preparation of a polarizing film according to another embodiment of the present invention.

Referring to FIG. 2 together with FIG. 1, a method for preparation of a polarizing film 900 according to the present invention comprises:

a first process 100 of washing a PVA film as the substrate film in a first bath 10 and measuring a temperature T10 of the first bath using a first bath thermometer 12;

a first annex (1A) process 200 of swelling the washed PVA film in a swelling tank 20;

a second process 300 of dipping the washed PVA film in a second bath 30 containing an iodine solution, dyes the same, and measuring temperature T30 and concentration C30 of the second bath using a second bath thermometer 32 and a second bath densitometer 34;

a second annex (2A) process 400 of washing the dyed PVA film in a second annex (2A) bath 40;

a third process 500 of stretching the iodine-dyed PVA film through a drawing roller to orient the dyed iodine of the PVA film in a third bath 50;

a drying process 600 of drying the iodine-oriented PVA film in an oven 60 and measuring a temperature of the oven using an oven thermometer 62; and a controlling process 800 of predicting a transmittance of a polarizing film using a central controller 80, on the basis of information regarding characteristics T10, T30, T60 and C30 of input data measured by the above thermometers 12, 32 and 62 of the first and second baths and the oven as well as the densitometer 34 of the second bath, and information regarding characteristics of a PVA film introduced into the continuous process, and then, controlling the temperatures T10, T30 and T60 of the first and second baths 10 and 30 and the oven 60 and an amount of a composition fed to the second bath 30.

In the second process 300, the PVA film is dipped in the second bath 30 containing an iodine solution at 20 to 40° C., and then, dyed. Thereafter, the PVA film is dried in the oven 60 at 40 to 60° C. in the drying process 600.

Figure 3:
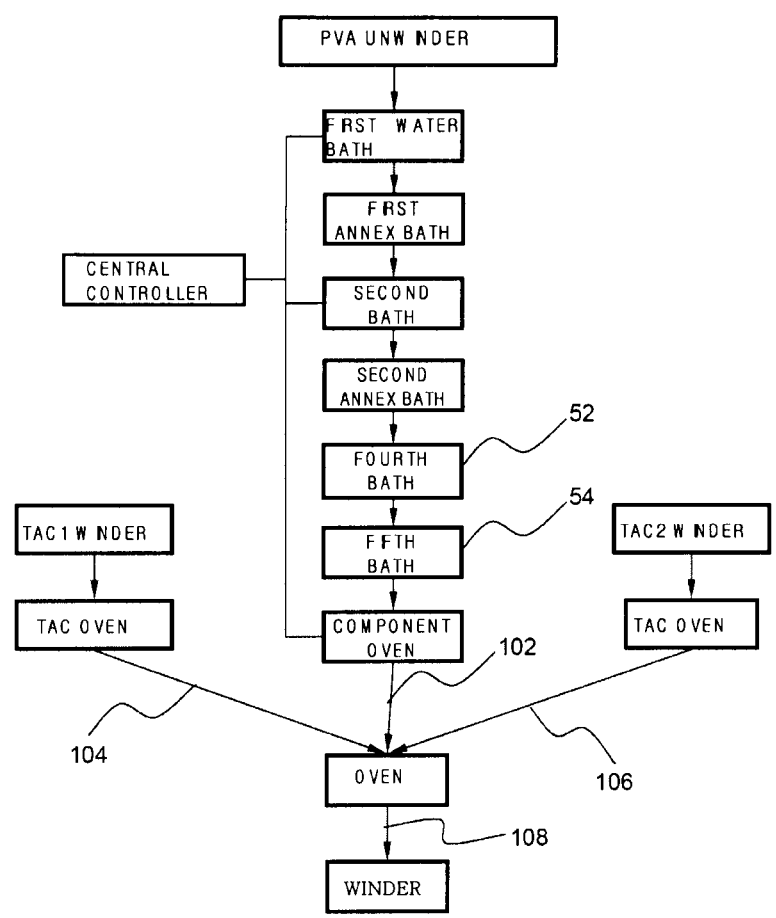
FIG. 3 is a schematic block diagram showing an apparatus for preparation of a polarizing film according to another embodiment of the present invention.
Figure 4:
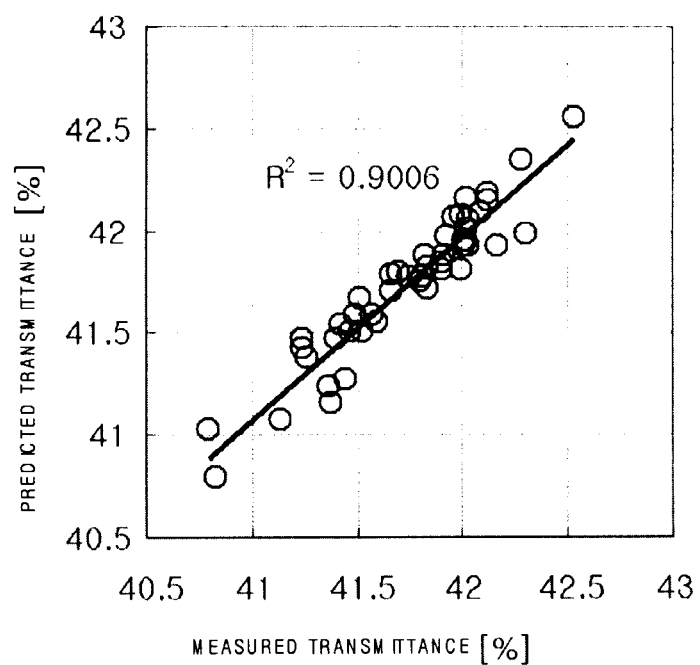
FIG. 4 is graphs showing correlation between predicted transmittance and measured transmittance according to another embodiment of the present invention.

FIG. 3 is a schematic block diagram showing an apparatus for preparation of a polarizing film according to another embodiment of the present invention.

Referring to FIG. 3 together with FIGS. 1 and 2, a polarizing sheet 108 may be fabricated by attaching protective films 104 and 106, which are made of triacetyl cellulose, respectively, to the top and bottom of a polarizing film 102 prepared according to the apparatus 90 for preparation of the polarizing film shown in FIG. 1.

The third process 500 described above may comprise a fourth process 502 using a fourth bath 52 and a fifth process 504 using a fifth bath 54, which are separated depending upon variation in revolution of a drawing roller, wherein the PVA film formed in the fourth process 502 may have a draw ratio of 1.5 to 3.0 times while the PVA film formed in the fifth process 504 may have a draw ratio of 2.0 to 3.0 times.

Figure 5:
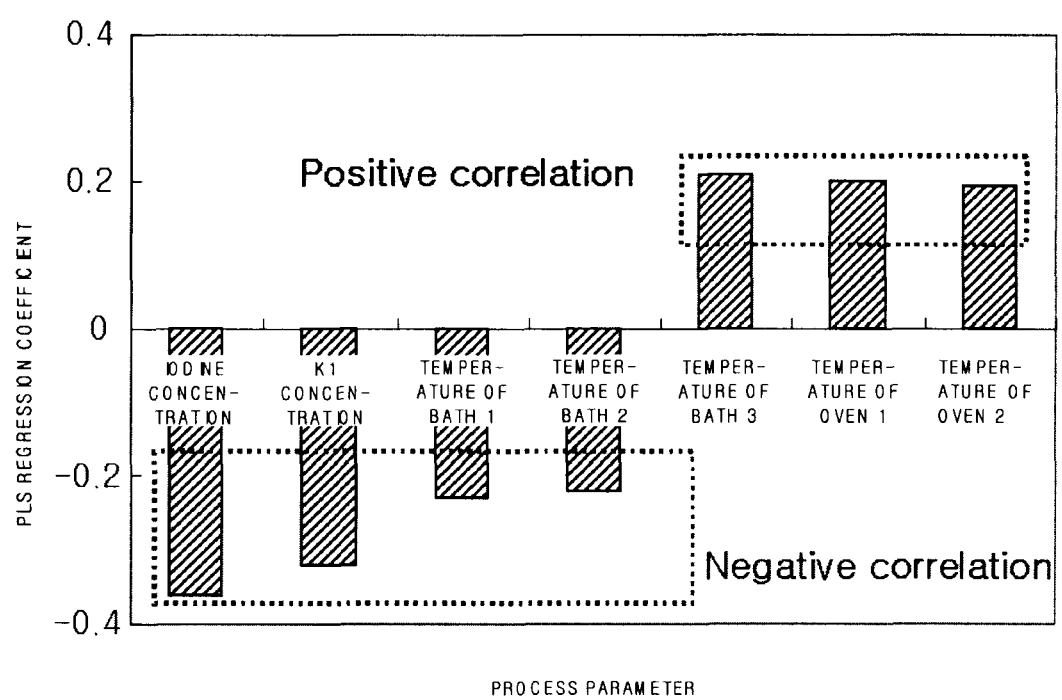
FIG. 5 is graphs showing correlation between seven (7) major process parameters and regression coefficients of partial least squares (PLS).

FIG. 5 is graphs showing correlation between seven (7) major process parameters and regression coefficients of partial least squares (PLS).

Referring to FIG. 5, it can be seen that some data including a concentration of iodine, a concentration of potassium, a temperature of the first bath (Bath 1) and a temperature of Bath 2 among second baths show negative correlation with a transmittance of a PVA film, while a temperature of Bath 3 among the second baths and temperatures of component ovens, that is, Oven 1 and Oven 2 have positive correlation with the transmittance of the PVA film.

Moreover, since transmittance is inversely correlated with a thickness of the PVA film, increasing the PVA film thickness may cause reduction in transmittance.

Those skilled in the art will appreciate that various modifications and alterations are possible, based on the foregoing description, without departing from the scope and spirit of the invention as defined in the appended claims.

INDUSTRIAL APPLICABILITY

As is apparent from the foregoing description, an apparatus for preparation of a polarizing film according to the present invention may have technical configurations that predict a transmittance of the polarizing film in advance, on the basis of information regarding characteristics of input data measured by thermometers of first and second baths and an oven as well as a densitometer of the second bath, and information regarding characteristics of a PVA film introduced into a continuous process, and then, control temperatures of the first and second baths and the oven and an amount of a composition fed to the second bath. Accordingly, the transmittance of the polarizing film may be preliminarily regulated without trial operation, thereby minimizing material loss of the PVA film and a shutdown period of a production line.

The invention claimed is:

1. An apparatus for preparation of a film exhibiting polarizing properties by dyeing a substrate film with iodine and then orienting the same through a continuous process, the apparatus comprising:
   a first bath equipped with a thermometer to measure a temperature of the first bath, in which a polyvinylalcohol (PVA) film as a substrate film is washed;
   a second bath equipped with a thermometer to measure a temperature of the second bath and a densitometer to measure a concentration of the second bath, in which the washed PVA film is dipped in an iodine solution and dyed therein;
   a third bath in which the iodine-dyed PVA film is stretched by a drawing roller to thereby orient the dyed iodine;
   an oven equipped with a thermometer to measure a temperature of the oven to dry the iodine-oriented PVA film; and
   a central controller that predicts a transmittance of the polarizing film, on the basis of information regarding characteristics of input data measured by the above thermometers of the first and second baths and the oven as well as the densitometer of the second bath, and information regarding characteristics of a PVA film introduced into the continuous process, and then, controls the temperatures of the first and second baths and the oven and an amount of a composition fed to the second bath.

2. The apparatus according to claim 1, wherein the second bath thermometer measures temperatures at two or more positions inside the second bath.

3. The apparatus according to claim 1, wherein the concentration of the second bath includes concentrations of iodine and potassium iodide.

4. The apparatus according to claim 1, wherein the composition in the second bath comprises iodine and potassium iodide.

5. The apparatus according to claim 1, further comprising a composition feeder to replenish the composition fed to the second bath, based on predicted results of the transmittance by the central controller.

6. The apparatus according to claim 1, wherein prediction of the transmittance is performed by a PVA film transmittance model based on Partial Least Squares (PLS).

7. The apparatus according to claim 1, further comprising a first annex bath to swell the washed PVA film and a second annex bath to wash the dyed PVA film.

8. A polarizing sheet fabricated by attaching a protective film to each of a top and bottom of a polarizing film prepared by the apparatus according to claim 1.

9. The polarizing sheet according to claim 8, wherein the protective film comprises triacetyl cellulose (TAC).

10. A method for preparation of a film exhibiting polarizing properties by dyeing a substrate film with iodine and then orienting the same through a continuous process, the method comprising:
   a first process of washing a PVA film as the substrate film in a first bath and measuring a temperature of the first bath using a first bath thermometer;
   a second process of dipping the washed PVA film in a second bath containing an iodine solution, dyeing the same, and measuring temperature and concentration of the second bath using a second bath thermometer and a second bath densitometer;

a third process of stretching the iodine-dyed PVA film through a drawing roller to orient the dyed iodine of the PVA film in a third bath;

a drying process of drying the iodine-oriented PVA film in an oven and measuring a temperature of the oven using an oven thermometer; and a control process of predicting a transmittance of a polarizing film, on the basis of information regarding characteristics of input data measured by the above thermometers of the first and second baths and the oven as well as the densitometer of the second bath, and information regarding characteristics of a PVA film introduced into the continuous process, and then, controlling the temperatures of the first and second baths and the oven and an amount of a composition fed to the second bath.

11. The method according to claim 10, further comprising a first annex process of swelling the washed PVA film in a first annex bath and a second annex process of washing the dyed PVA film in a second annex bath.

\* \* \* \* \*